(12) United States Patent
Jacobs et al.

(10) Patent No.: US 11,973,859 B2
(45) Date of Patent: Apr. 30, 2024

(54) DATA ENCRYPTION FOR EMERGENCY RESPONSE

(71) Applicant: Apple Inc., Cupertino, CA (US)

(72) Inventors: Frederic Jacobs, Canton of Vaud (CH); Yannick L. Sierra, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 255 days.

(21) Appl. No.: 17/123,856

(22) Filed: Dec. 16, 2020

(65) Prior Publication Data

US 2021/0243018 A1 Aug. 5, 2021

Related U.S. Application Data

(60) Provisional application No. 62/968,092, filed on Jan. 30, 2020.

(51) Int. Cl.
| | |
|---|---|
| *H04L 9/08* | (2006.01) |
| *H04L 9/32* | (2006.01) |
| *H04W 4/029* | (2018.01) |
| *H04W 4/90* | (2018.01) |

(52) U.S. Cl.
CPC .......... *H04L 9/0825* (2013.01); *H04L 9/3236* (2013.01); *H04W 4/029* (2018.02); *H04W 4/90* (2018.02); *H04L 2209/04* (2013.01); *H04L 2209/80* (2013.01)

(58) Field of Classification Search
CPC ................................................... H04L 9/0825
See application file for complete search history.

(56) References Cited

U.S. PATENT DOCUMENTS

| | | | |
|---|---|---|---|
| 6,574,733 B1 | 6/2003 | Langford | |
| 7,184,744 B1 * | 2/2007 | Schnabel | ............... G01S 19/02 342/357.395 |
| 8,792,852 B2 * | 7/2014 | Keller | .................... H04W 4/06 455/414.3 |

(Continued)

FOREIGN PATENT DOCUMENTS

| | | |
|---|---|---|
| CN | 104680076 A | 6/2015 |
| CN | 105411554 A | 3/2016 |
| CN | 110114835 A | 8/2019 |

OTHER PUBLICATIONS

"International Search Report and Written Opinion," dated Mar. 22, 21021 in International Application No. PCT/US2021/012305. 11 pages.

(Continued)

*Primary Examiner* — Simon P Kanaan
(74) *Attorney, Agent, or Firm* — Kilpatrick Townsend & Stockton LLP

(57) ABSTRACT

Embodiments described herein provide a method on a mobile electronic device to facilitate the transmission of encrypted user data to a service provider, such as an emergency service provider. An encrypted data repository stores user data to be transmitted to the service provider. A key to decrypt the encrypted data repository is wrapped using a key associated with a publicly trusted certificate for the service provider. In response a request received at the mobile device to initiate an emergency services request, the mobile device can transmit the encrypted data repository and wrapped cryptographic material to a server that is accessible by the service provider.

20 Claims, 12 Drawing Sheets

(56) References Cited

U.S. PATENT DOCUMENTS

| | | | | |
|---|---|---|---|---|
| 2005/0246771 | A1* | 11/2005 | Hunt | H04L 9/3273 |
| | | | | 726/18 |
| 2008/0317218 | A1 | 12/2008 | Connell et al. | |
| 2009/0270949 | A1* | 10/2009 | Kalpin | G16H 40/40 |
| | | | | 607/60 |
| 2013/0247194 | A1* | 9/2013 | Jha | H04W 12/128 |
| | | | | 726/23 |
| 2020/0321108 | A1* | 10/2020 | Reid | G16H 40/67 |

OTHER PUBLICATIONS

Gemalto—security to be free, "Google Cloud Platform Customer Supplied Encryption Key (CSEK) Beta," Integration Guide. Document No. 007-013795-001, Rev. B. Released Aug. 2017. 25 pages.

Nellessen, Eric, "Transparency and Security for Client-side Encrypting Cloud Storage Applications." Humboldt University of Berlin. 85 pages. Feb. 8, 1989.

The Chinese Patent Application No. CN202180011846.3, "Office Action", mailed Dec. 29, 2024, 13 pages.

Xiaoxia, et al., "Research on Security Management Mechanism of Smart TV Terminals", Broadcast and Television Technology, vol. 45, No. 3, 2018, pp. 74-77.

\* cited by examiner

DATA ENCRYPTION FOR EMERGENCY RESPONSE

CROSS-REFERENCE

This application claims benefit of priority to U.S. Provisional Application No. 62/968,092, filed Jan. 30, 2020, which is hereby incorporated herein by reference.

FIELD

Embodiments described herein relate generally to cryptographic techniques to secure user data. More specifically, embodiments relate techniques to enable the delivery of encrypted user data to emergency responders.

BACKGROUND OF THE DESCRIPTION

When a user of a mobile device calls emergency services, the emergency services dispatcher may not be able to determine the specific location of the mobile device. Some emergency service providers may be able to query a wireless carrier associated with the mobile device to determine a location for the device. However, the location determined by the wireless carrier may be a cell tower-based location, which is a coarse location determination with significant margin for error.

SUMMARY OF THE DESCRIPTION

Embodiments described herein provide a method on a mobile electronic device to facilitate the transmission of encrypted user data to a service provider, such as an emergency service provider (e.g., fire, police, ambulance, emergency medical technicians) or various support service providers that are associated with the emergency service providers of an area. The method includes receiving and storing a set of publicly trusted certificates, generating cryptographic material to encrypt a data repository that stores user data, encrypting the data repository using the cryptographic material, and wrapping the cryptographic material using a key associated with a publicly trusted certificate. The publicly trusted certificate is associated with the service provider. In response to input at the mobile device to initiate an emergency services request, the mobile device can transmit the encrypted data repository and wrapped cryptographic material to a server for storage in a storage repository. The storage repository can be accessible by the service provider.

One embodiment provides a data processing system on a mobile electronic device. The data processing system includes a wireless network interface, a memory device having instructions stored thereon, and one or more processors coupled with the wireless network interface and the memory device. The one or more processors are configured to execute instructions stored on the memory device. The instructions cause the one or more processors to receive and store a set of publicly trusted certificates, generate cryptographic material to encrypt a data repository that stores user data, encrypt the data repository using the cryptographic material to generate an encrypted data repository, and wrap the cryptographic material using a key associated with a publicly trusted certificate. The one or more processors can then transmit, via the wireless network interface, the encrypted data repository and wrapped cryptographic material to a server for storage in a storage repository. The storage repository is accessible by the service provider.

Other embodiments provide a non-transitory, machine readable medium that stores instructions to perform operations of any method described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
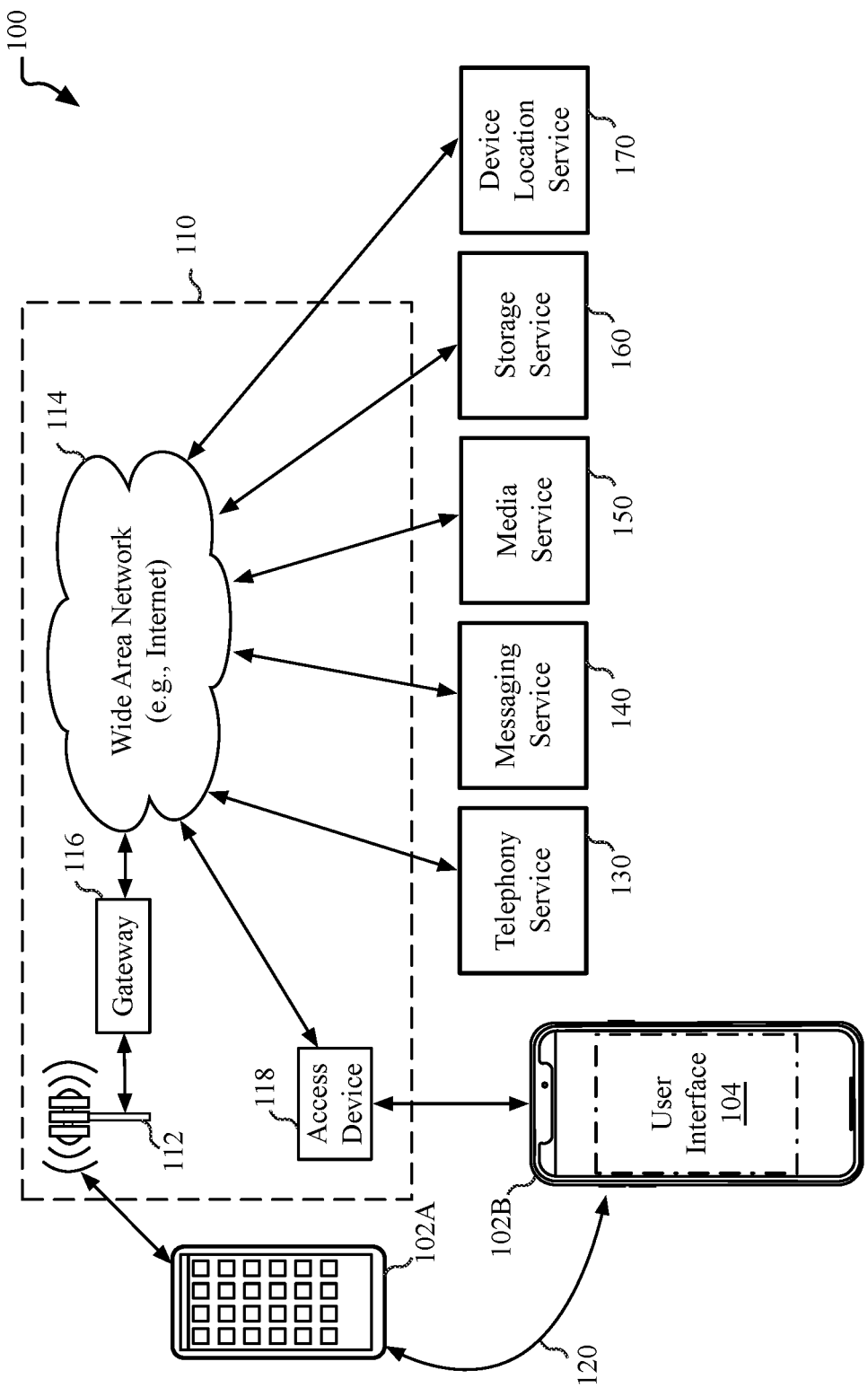
FIG. 1 is a block diagram of a network operating environment for mobile devices.

Embodiments described herein provide techniques to enable the delivery of encrypted user data to emergency responders. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

In one embodiment, mobile device data, including location data associated with the mobile device, as well as additional data stored on or generated by the mobile device (e.g., user health data, sensor data, etc.) may be securely relayed to emergency service providers using encryption methodologies described herein. The additional data may be stored in an additional data repository (ADR) that is encrypted and stored on a server. The additional data repository may be encrypted by the mobile device using a symmetric encryption key. The symmetric encryption key may then be encrypted using a public key associated with an emergency service provider. Upon the occurrence of an emergency event, or in association with a request for emergency services, the mobile device can store location data, ADR, and a decryption key that is wrapped (e.g., encapsulated, encrypted) using a key that is specific to the emergency service provider. The emergency service provider can then retrieve the location data, the ADR, and the wrapped decryption key. The emergency service provider can then unwrap the wrapped decryption key and decrypt the ADR to facilitate the provision of emergency services to the user of the mobile device. Details of the above embodiment, as well as other embodiments, are detailed below.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2020 Apple Inc.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, and a device location service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device location service 170 can enable a user to locate a lost or misplaced device that was, at least at some point, connected to the one or more wired and/or wireless networks 110. The device location service 170 can also be used to facilitate the determination of a device location to facilitate the provision of emergency services to the user of mobile device 102A-102B. Other services can also be provided, including a software update service to update operating system software or client software on the mobile device, as well as asset distribution services that can be used to distribute digital assets to the mobile devices 102A-102B. In one embodiment, the messaging service 140, media service 150, storage service 160, and device location service 170 can each be associated with a cloud service provider, where the various services are facilitated via a cloud services account associated with the mobile devices 102A-102B.

Figure 2:
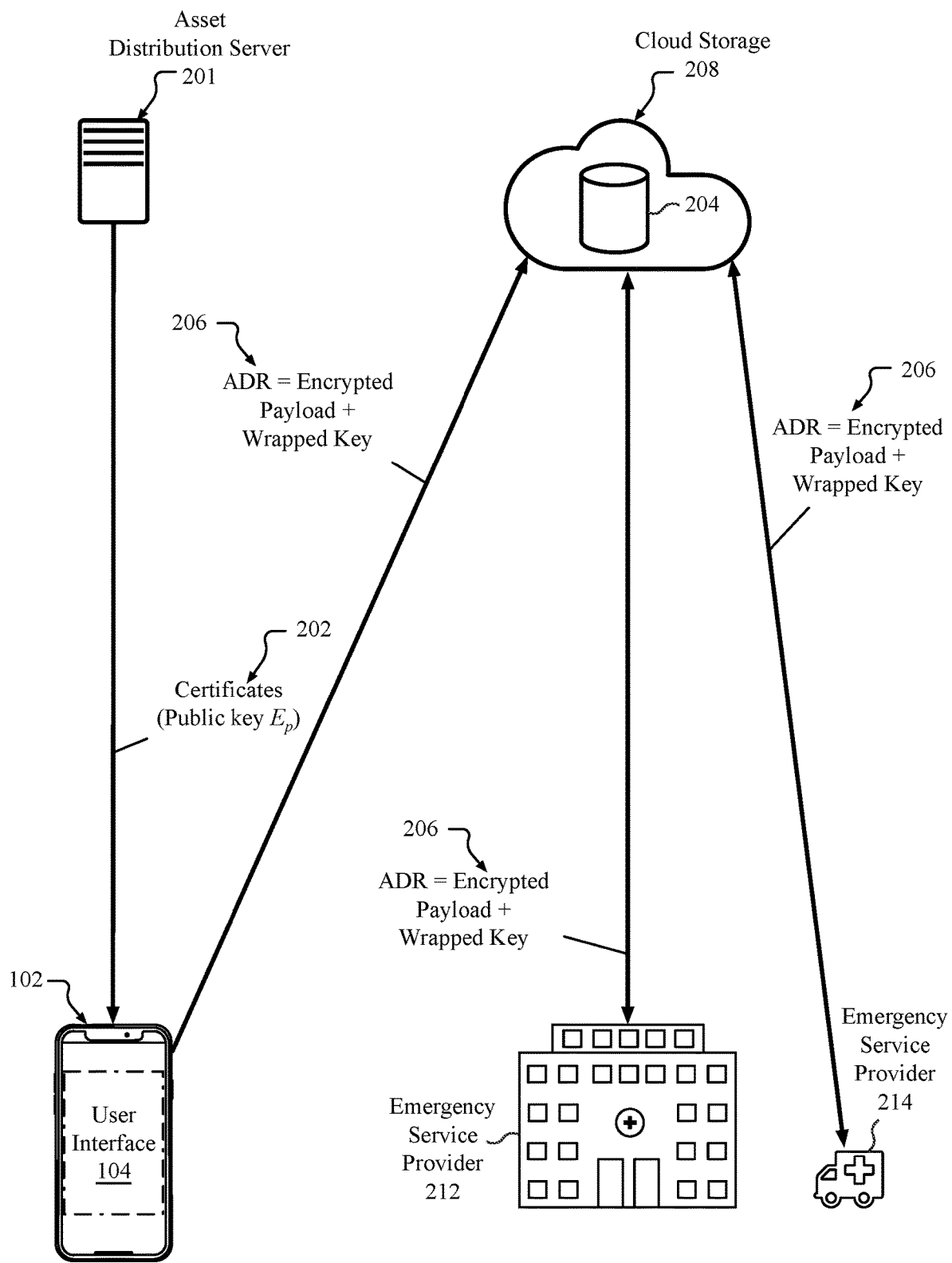
FIG. 2 illustrates an architecture to enable data encryption for emergency response, according to an embodiment.

FIG. 2 illustrates an architecture to enable data encryption for emergency response, according to an embodiment. In one embodiment a mobile device vendor, or a service provider associated with the mobile device vender, can provide an asset distribution server 201 that stores digital assets to be distributed to mobile devices. The asset distribution server 201 provides an asset distribution mechanism that enables certificates 202 associated with an emergency service providers 212, 214 to be distributed to a mobile device 102. The asset distribution server can be associated with a content delivery network (CDN). Each of the certificates 202 can be provided to the asset distribution server 201 by an emergency service provider 212, 214. Each emergency service provider 212, 214 provides a separate certificate. The certificates 202 may be publicly trusted certificates that contain a certificate chain that allows evaluation of the validity of the certificate. The certificate chain can of each certificate can be evaluated through to a certificate authority root certificate that may be stored in a trust store on the mobile device 102. The certificates 202 can each specify a public key ($E_p$) of a public/private key pair associated with an emergency service provider 212, 214. The specific details of the public key may vary, and may be but are not limited to a P-384 (secp384r1) public key. In one embodiment each of the certificates 202 has a specific object identifier (OID) that can be tracked and audited (e.g., via the Certificate Transparency standard). In one embodiment, partner certificates may rotate periodically, which limits the data exposed in the case of a compromise.

The certificates 202 that are distributed to the mobile device 102 may be determined by the location of the mobile device and the partnered emergency service providers that operate in the area of the location of the mobile device. When the user of the mobile device travels with the mobile device to a new area, the mobile device 102 can receive certificates 202 for that the new area for the partnered emergency service providers in that area. The certificates 202 can then be stored on the mobile device 102 for use when contacting a partnered emergency service provider. In one embodiment, the certificates 202 for emergency service partners can be automatically downloaded based on a determined location of the mobile device 102 if the certificates 202 are not already present on the mobile device and/or when updated certificates become available at the asset distribution server 201. For international travel, certificates 202 can be acquired in concert with the automatic acquisition of emergency services or consulate information for the current nation or region of the mobile device 102.

Upon the mobile device 102 initiating contact (e.g., via a phone call) with an emergency service provider, the mobile device can derive cryptographic material that includes an encryption key k and an initialization vector $IV_1$. The cryptographic material may be used to encrypt an additional data repository (ADR) that stores data to be provided to the emergency service provider 212, 214. The encryption key k may be, but is not limited to a random 32-byte symmetric key, while initialization vector $IV_1$ may be a 16-byte random value. Using encryption key k, the mobile device 102 can encrypt an ADR payload using an authenticated cipher. In one instantiation of the protocol the authenticated cipher may be AES-GCM, where the encrypted ADR can be generated as:

Encrypted $ADR=IV_1\|Ciphertext_1\|Tag_1=AES\text{-}GCM\text{-}Encrypt_{256}(k, IV_1, ADR)$ However, the protocol is not limited to any specific authenticated cipher.

The mobile device 102 can then compute a hash value h of the ciphertext using, for example, SHA-256, such that h=SHA256(Encrypted ADR). The hash value h can be used to detect any subsequent substitution of stored encrypted data. Once the ADR has been encrypted and hashed, the encrypted payload may be prepared for upload to a server, such as a cloud storage server 208. In preparing the encrypted payload, an ADR package 206 can be prepared that includes the encrypted ADR, as well as a wrapped key that may be used to decrypt the encrypted ADR. The provider of the cloud storage server will not be able to encrypt or decrypt the ADR package 206, even though the package is stored on the cloud storage server 208, as the cryptographic material to encrypt or decrypt the ADR package 206 is not known to the cloud storage provider. Accordingly, end-to-end encryption is enabled for the ADR package 206 between the mobile device 102 and each emergency service provider 212, 214.

A wrapped key can be generated using a key encapsulation mechanism (KEM) that includes multiple inputs, with at least one input being a public key provided by a certificate within the certificates 202 the partnered service providers that are downloaded from the asset distribution server 201. A wrapped key can be generated for each of the certificates 202 associated with each partnered emergency service provider (e.g., emergency service provider 212, emergency service provider 214). Additionally, each emergency service provider 212, 214 that partners with the vendor of the mobile device can be assigned a partner identifier $ID_p$, which may be a universally unique identifier (UUID). For each partner identifier $ID_p$, encryption key k may be encrypted using the elliptic curve integrated encryption scheme (ECIES) to generate a wrapped encryption key. However, embodiments are not limited to the use of elliptic curves, and other encryption techniques, such as RSA encryption, can also be used. The mobile device 102 can generate an ephemeral encryption key pair $E_D$ to wrap the encryption key k. The ephemeral encryption key pair $E_D$ may be a P-384 key pair. The mobile device 102 can then use a key agreement protocol, such as but not limited to Elliptic-curve Diffie-Hellman (ECDH), to generate a shared secret SS using $E_D$ and $E_P$, where $E_P$ is the partner key, such that SS=ECDH($E_D, E_P$). A 32-byte symmetric key $k_p$ and 16-byte $IV_2$ for encrypting the key to be sent to the partner can be generated, where:

$k_p\|IV_2=X9.63\ KDF_{SHA256}(SS,$
SharedInfo=$E_D\|I_P\|KeyID(I_P)\|h\|t\|ID_P$, output=48).

The KeyID function can take the X9.63 representation of the public key and hash the representation using SHA-256, returning the first 2 bytes of the hash for use as a KeyID. While an X9.63 key derivation function is described as an example, other key derivation functions may be used. The use and transmission of the KeyID allows the receiving server to disambiguate between different keys stored on the server, as different versions of the key may be stored due to key rolling.

Hash value h used in derivation of symmetric key $k_p$, as shown above, is content binding and prevents substitution on the ADR package 206 without replacement of the key. In the case in which the data is uploaded and used for two or more different Emergency providers, a threat may exist in which a key recovered from a first emergency provider may allow an adversary to modify the encrypted data in a non-detectable way to the second Emergency provider. Hash value h prevents this occurrence without detection. Modification of the ADR package 206 by a compromise partner will be detected by the second partner because the wrapped key sent to the second partner will be bound to the hash of the original ciphertext. In such scenario, the hash used by the second partner will be mismatching causing a decryption failure of the tampered data. By entangling the hash value in the KDF, as shown above, this protection is enabled without sending the hash value itself to the server by explicitly. As the wrapping key is derived using the hash value as input, the derived key may be considered a representation of the hash value. Alternatively, where high bandwidth data links are available, the hash value may be sent directly in the case where the byte saving is less relevant than the relative increase in overall performance that may be available by sending the hash value instead of entangling the hash value within the KDF.

Identifier $ID_P$ is the UUID of a partnered emergency service provider 212, 214. Identifier $ID_P$ may be encoded as an ASCII-encoded byte array. Time t is a timestamp that represents the current date and time in which the key is wrapped. Time t may be encoded as, but is not limited to a 64-bit Linux Epoch Timestamp. In some implementations, human date timestamps may also be used.

The mobile device 102 may then perform an authenticated encryption technique, where:

$$Tag_2 \| Ciphertext_2 = AES\text{-}GCM\text{-}Encrypt_{256}(k_p, IV_2, k);$$
$$\text{and } WK_{UUID} = KeyID(E_P) \| E_D \| Ciphertext_2 \| Tag_2.$$

The wrapping keys [t, [$ID_P$: $WK_{UUID}$]] can be uploaded to the cloud storage server 208 as part of the ADR package 206. The wrapping keys can be incorporated into the ADR package 206, such that Wrapped Key=wrapping keys [t, [$ID_{P_i}$: $WK_{UUID_i}$]] for each of the certificate i in the certificates 202 that are stored in the ADR package 206. In this instance, the wrapped key within the ADR package 206 includes wrapping key data $ID_P$ and $WK_{UUID}$ for each partner certificate stored on the mobile device 102. The ADR package 206 can be uploaded to the cloud storage server 208 to be stored within a cloud storage repository 204 that is accessible to the partnered emergency service providers 212, 214. Each partnered emergency service provider 212, 214 that participates in the emergency response can retrieve the ADR package 206 from the cloud storage server 208, identify the wrapping key data that is specific to the provider, derive the decryption key that may be used to decrypt the encrypted payload, then decrypt the decrypted payload. Once the data is encrypted and transmitted, the mobile device 102 can discard the keying material that is used to encrypt the encrypted payload. On future contacts to emergency services, fresh keying information is derived. Whenever a new ADR package 206 is to be uploaded to the cloud storage server 208, a new symmetric key $k_p$ is derived that is random and independent from previous keys to enable forward secrecy.

To encrypt a retrieved ADR package 206, a computing device (e.g., server, client) associated with the partnered emergency service provider 212, 214 can check if timestamp t is within the expected allowed interval. If the payload and/or the wrapping time of the key is older than the largest allowed date, decryption may still proceed but a warning is triggered to the responder to suggest that the information may be either outdated or has been replayed. The provider can then determine the specific partner key $E_P$ that was used to wrap the key. As key $E_P$ may be rolled periodically, the most recent instance of the key may not be the key that was used in the wrapping process. The provider can determine the specific key $E_P$ using KeyID($E_P$) from WK. If the KeyID is not known or the identified key has been deleted, decryption is aborted.

The shared secret SS=ECDH($E_D$, $E_P$) is derived, where $E_P$ is the partner key, using ECDH over P-384. The 32-byte symmetric key $k_p$ and 16-byte $IV_2$ for use in decrypting the key sent to the partner can be generated, where:

$$k_p \| IV_2 = X9.63\ KDF_{SHA256}(SS,$$
$$SharedInfo = E_D \| E_P \| KeyID(E_P) \| h \| t \| ID_P, \text{output}=48).$$

Using authenticated encryption, the decryption key k may be decrypted, where:

$$k = AES\text{-}GCM\text{-}Decrypt_{256}(k_p, IV_2, Tag_2, Ciphertext_2)$$

The encrypted payload can then be decrypted, such that:

$$ADR_{payload} = AES\text{-}GCM\text{-}Decrypt_{256}(k, IV_1, Tag_1, Ciphertext_1)$$

Decryption of the ADR decryption key on the part of the partnered emergency service provider 212, 214 can follow ECIES, but embodiments are not limited as such.

The data stored in the encrypted payload can then be used by the partnered emergency service provider 212, 214 to facilitate the provision of emergency services. The specific information stored in the ADR can vary and can include, for example, health data gathered by the mobile device 102 or a wearable electronic device associated with the mobile device 102. Health data can include but is not limited to heart rate, blood oxygen saturation, and/or electrocardiogram data.

In one implementation, the ADR package 206 can also include a current geographic location determined for the mobile device 102. In other implementations, instead of sending the current geographic location as determined by the mobile device 102 in the ADR package 206, location information server (LIS) may be separately transmitted, which enables the emergency service provider 212 to access a location or a location stream for the mobile device 102 that is facilitated by, for example, the device location service 170 as in FIG. 1. The location data can be geographic data in the form of longitude and latitude coordinates. In some embodiments, location data can also include three-dimensional location data that includes an altitude coordinate. Location data can also be correlated with building information and location can include an estimate floor of a user when the user is calling from a multi-story structure.

Figure 3:
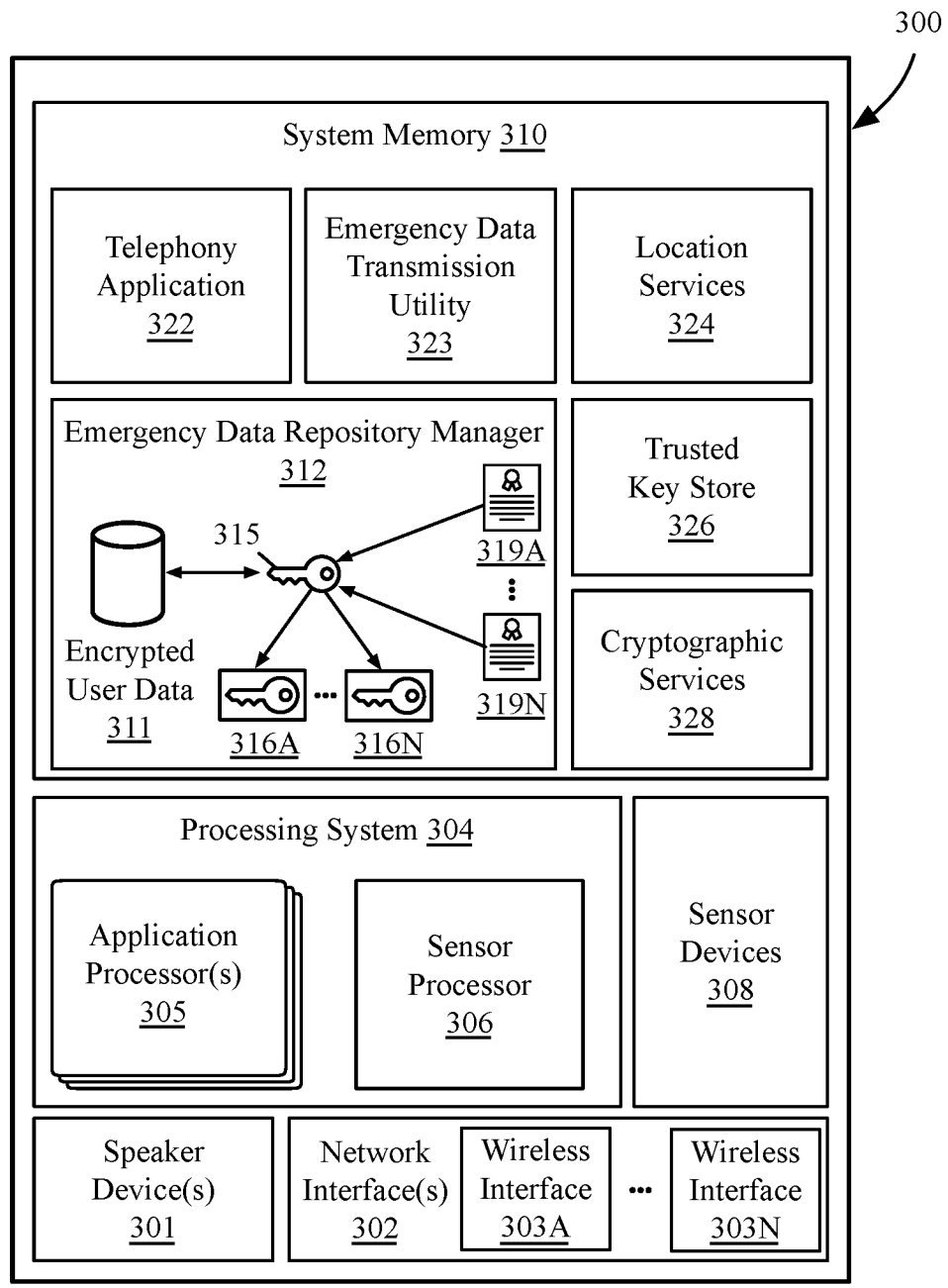
FIG. 3 is a block diagram of a system architecture associated with a mobile device, according to an embodiment.

FIG. 3 is a block diagram of a system architecture 300 associated with a mobile device 102, according to an embodiment. The mobile device 102 can include one or more speaker devices 301 to enable playback of the audio portion of media, alarm, alert, notification, or telephone calls played on or performed by the mobile device 102. The mobile device 102 also includes at least one network interface 302, which can include one or more wireless interfaces 303A-303N to enable wireless network connectivity. The one or more wireless interfaces 303A-303N can couple with baseband processing logic that provides support for wireless networking protocols such as, but not limited to Bluetooth, Wi-Fi, near field communication (NFC), other wireless networking technologies. In some implementations, the network interface 302 may also support a wired network connection. In some implementations, at least one of the wireless interfaces 303A-303N can facilitate long-range wireless communication such as, for example, satellite-based communication. Such long-range communication may be one way or two-way communication. Long-range communication mechanisms may be lower-bandwidth relative to other communication mechanisms.

The computing device also includes a processing system 304 having multiple processor devices. In one embodiment the processing system 304 includes one or more application processor(s) 305 to execute instructions for user and system applications that execute on the computing device. The processing system can also include a sensor processor to process and monitor a suite of sensor devices 308 having sensors including, but not limited to motion sensors, light sensors, proximity sensors, biometric sensors, audio sensors (e.g., microphones), and image sensors (e.g., cameras). The sensor processor 306 can enable low-power monitoring of always-on sensors within the suite of sensor devices 308. The sensor processor 306 can allow the application processor(s) 305 to remain in a low power state when the mobile device 102 is not in active use while allowing the mobile device 102 to remain accessible via voice or gesture input to a virtual assistant or to incoming network data received via the network interface 302.

In one embodiment the mobile device 102 includes a system memory 310 which can be a system virtual memory having an address space that includes volatile and non-volatile memory. The system memory 310 can include a telephony application 322, an emergency data transmission utility 323, and location services logic 324. The telephony application 322 enables the mobile device 102 to contact an emergency service provider. The emergency data transmission utility 323 facilitates the transmission of emergency data from the mobile device 102, such as but not including ADR data and/or location data. The location services logic 324 enables software logic to query current and historical location data for the mobile device 102.

The system memory 310 can also include an emergency data repository manager 312. The emergency data repository manager 312 can facilitate the encryption of user data into encrypted user data 311. The emergency data repository manager 312 can also facilitate the wrapping of an encryption key 315 for the encrypted user data 311. The encryption key 315 for the encrypted user data can be wrapped for each public certificate 319A-319N provided by the asset distribution server 201 to generate a set of wrapped keys 316A-316N. Each public certificate 319A-319N can include certificate chain that facilitates the evaluation of the public certificates, all the way up to a CA root key that is stored in a trusted key store 326 of the mobile device 102. Encryption operations performed by the emergency data repository manager 312 can be assisted or accelerated by a cryptographic services library 328 that is stored in system memory 310. The cryptographic services library 328 can provide encryption primitives that are accelerated using cryptographic engines within the mobile device.

Figure 4A:
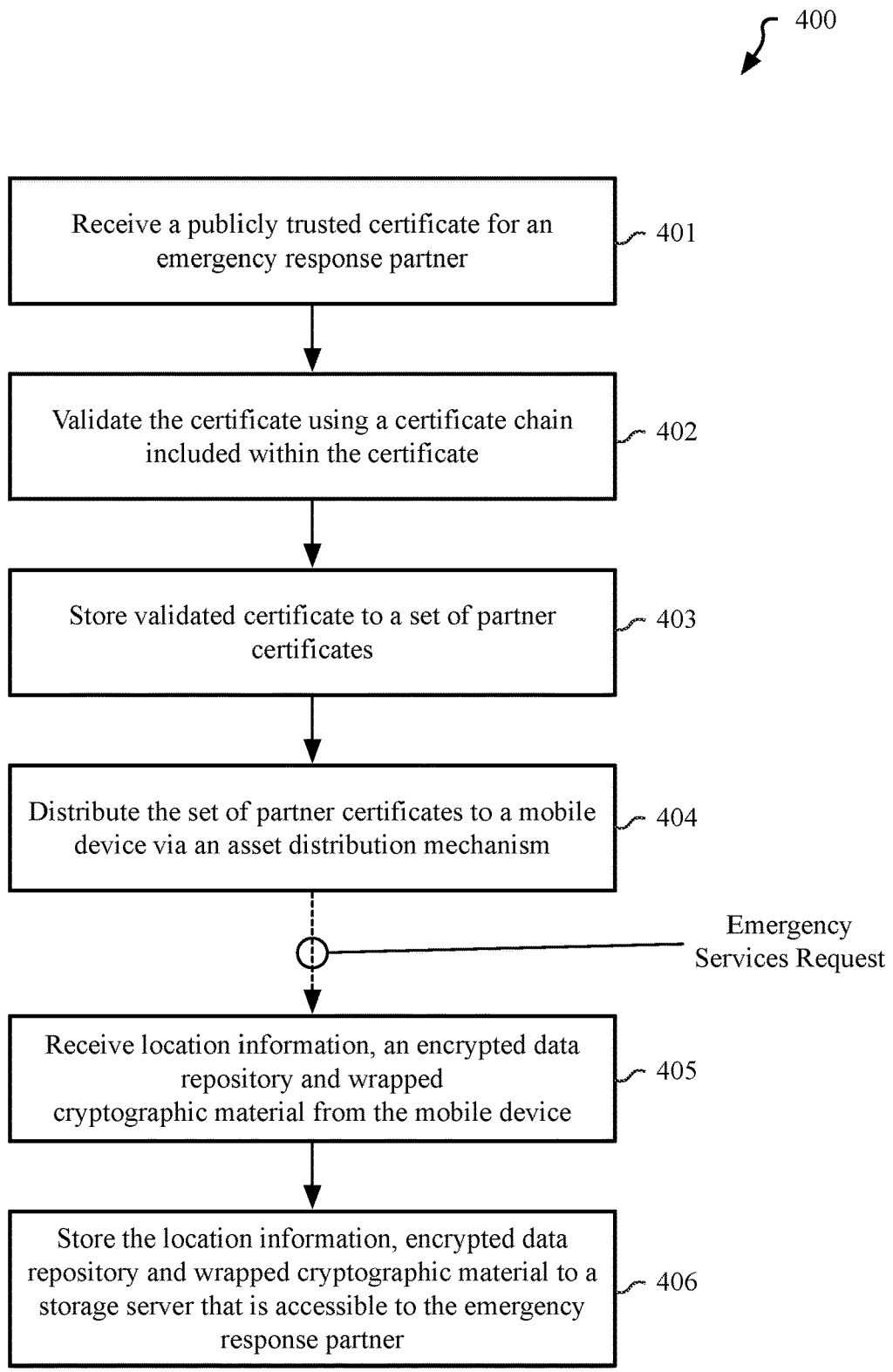
FIG. 4A-4B are flow diagrams of methods performed at a server and mobile device to facilitate the provision of encrypted data to emergency service providers.
Figure 4B:
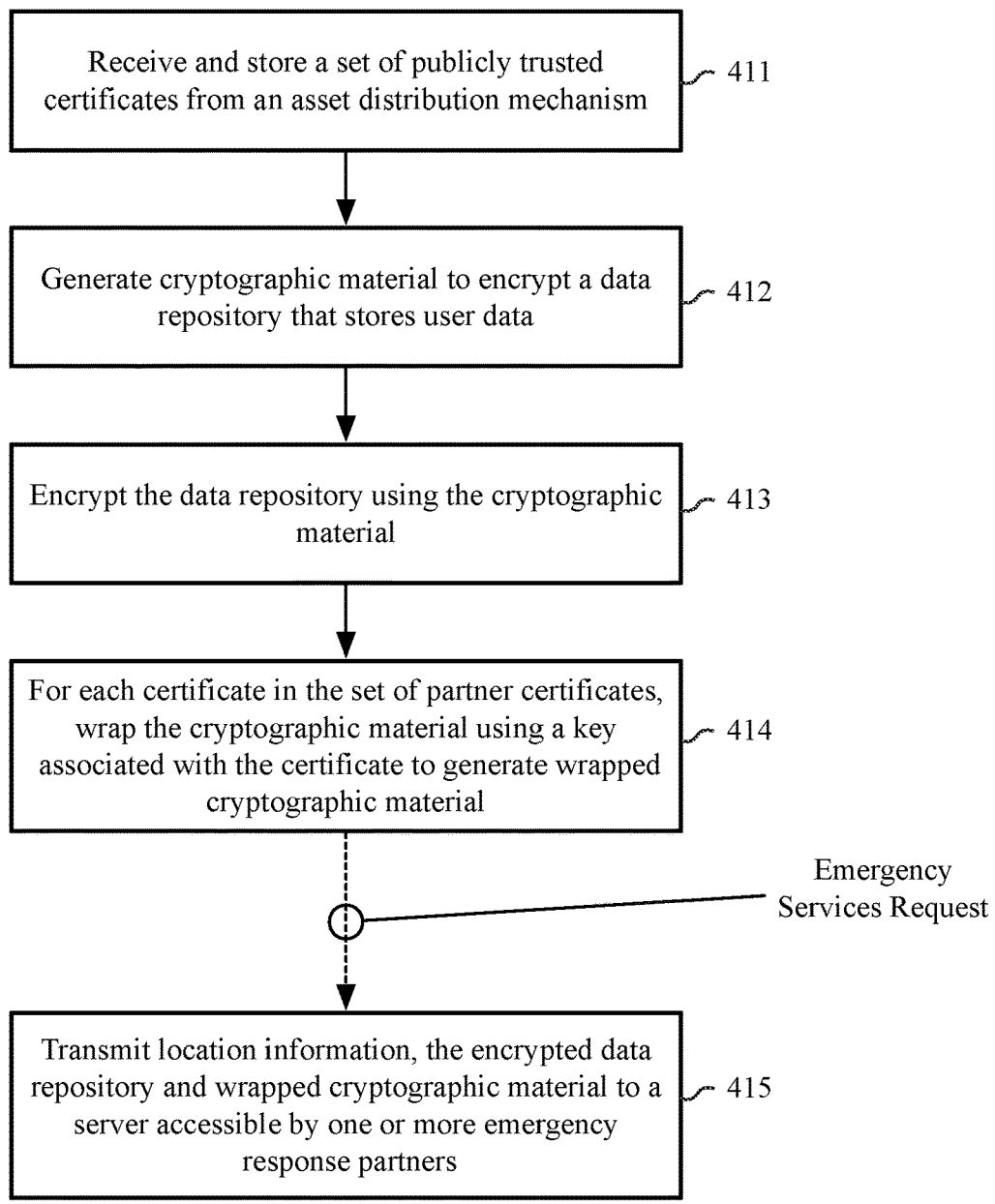

FIG. 4A-4B are flow diagrams of methods performed at a server and mobile device to facilitate the provision of encrypted data to emergency service providers. FIG. 4A illustrates a method 400 performed at a server device associated with a mobile device vender. FIG. 4B illustrates a method 410 performed at a mobile device. The server device of method 400 may be one or more of the asset distribution server 201 and/or cloud storage server 208 as in FIG. 2. The methods 400, 410 below describe a generalized version of the specific operations described above.

As shown in FIG. 4A, a server device can receive a publicly trusted certificate for an emergency response partner (401). The server device can then validate the certificate using a certificate chain included within the certificate (402). The server can then store validated certificate to a set of partner certificates (403) and distribute the set of partner certificates to a mobile device via an asset distribution mechanism (404). After an emergency services request performed by a mobile device, the server can receive location information, an encrypted data repository and wrapped cryptographic material from the mobile device (405) and store the location information, encrypted data repository and wrapped cryptographic material to a storage server that is accessible to the emergency response partner (406).

As shown in FIG. 4B, a mobile device can receive and store a set of publicly trusted certificates from an asset distribution mechanism (411). The asset distribution mechanism may be an asset distribution server managed by or associated with a mobile device vendor. The mobile device can generate cryptographic material to encrypt a data repository that stores user data (412) and then encrypt the data repository using the cryptographic material (413). For each certificate in the set of partner certificates, the mobile device can wrap the cryptographic material using a key associated with the certificate to generate wrapped cryptographic material (414). In response to input at the mobile device to initiate an emergency services request, the mobile device can transmit location information, the encrypted data repository and wrapped cryptographic material to a server accessible by one or more emergency response partners (415).

Figure 5:
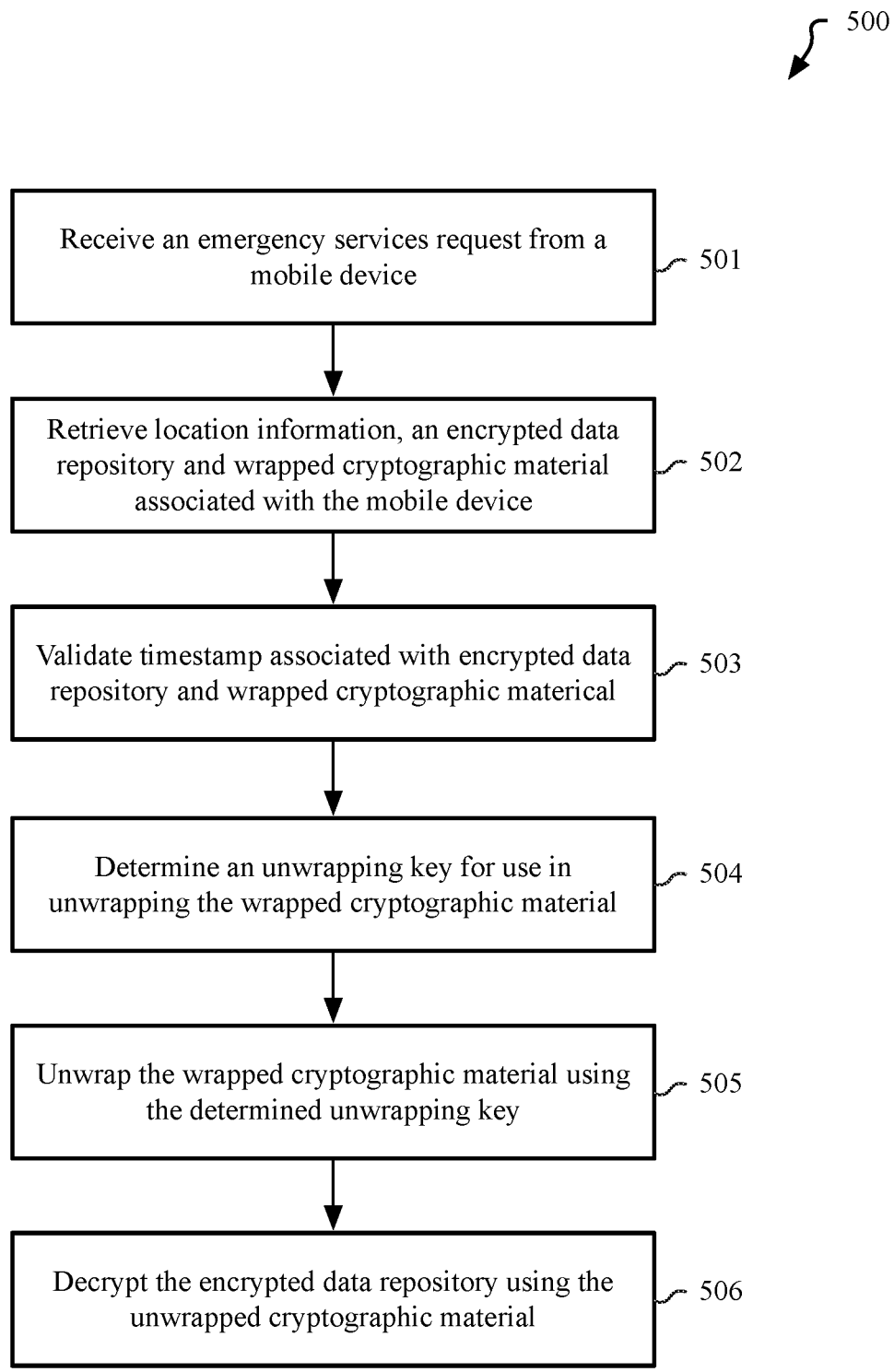
FIG. 5 is a flow diagram of a method performed by a computing device of an emergency service provider to access encrypted data.

FIG. 5 is a flow diagram of a method 500 performed by a computing device (e.g., server, workstation, mobile device, etc.) of an emergency service provider to access encrypted data. Method 500 describes a generalized version of the specific operations described above.

The emergency service provider computing device, or an associated computing device, can receive an emergency services request from a mobile device (501). The computing device can then retrieve location information, an encrypted data repository and wrapped cryptographic material associated with the mobile device (502) and validate timestamp associated with encrypted data repository and wrapped cryptographic material (503). The computing device can then determine an unwrapping key for use in unwrapping the wrapped cryptographic material (504) and unwrap the wrapped cryptographic material using the determined unwrapping key (505). The computing device can then decrypt the encrypted data repository using the unwrapped cryptographic material (506).

Figure 6A:
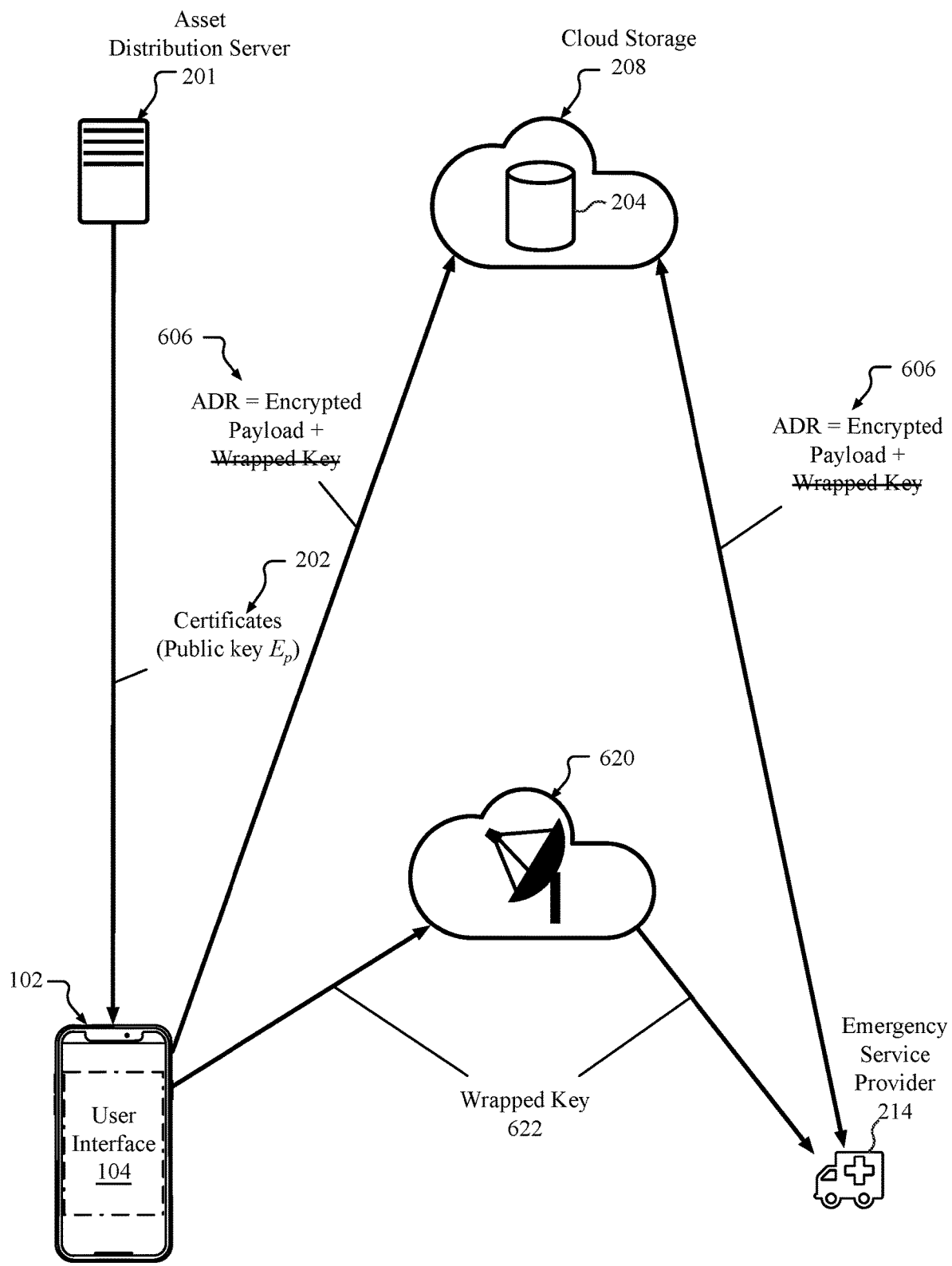
FIG. 6A-6B illustrates additional architectures to enable data encryption for emergency response, according to an embodiment.
Figure 6B:
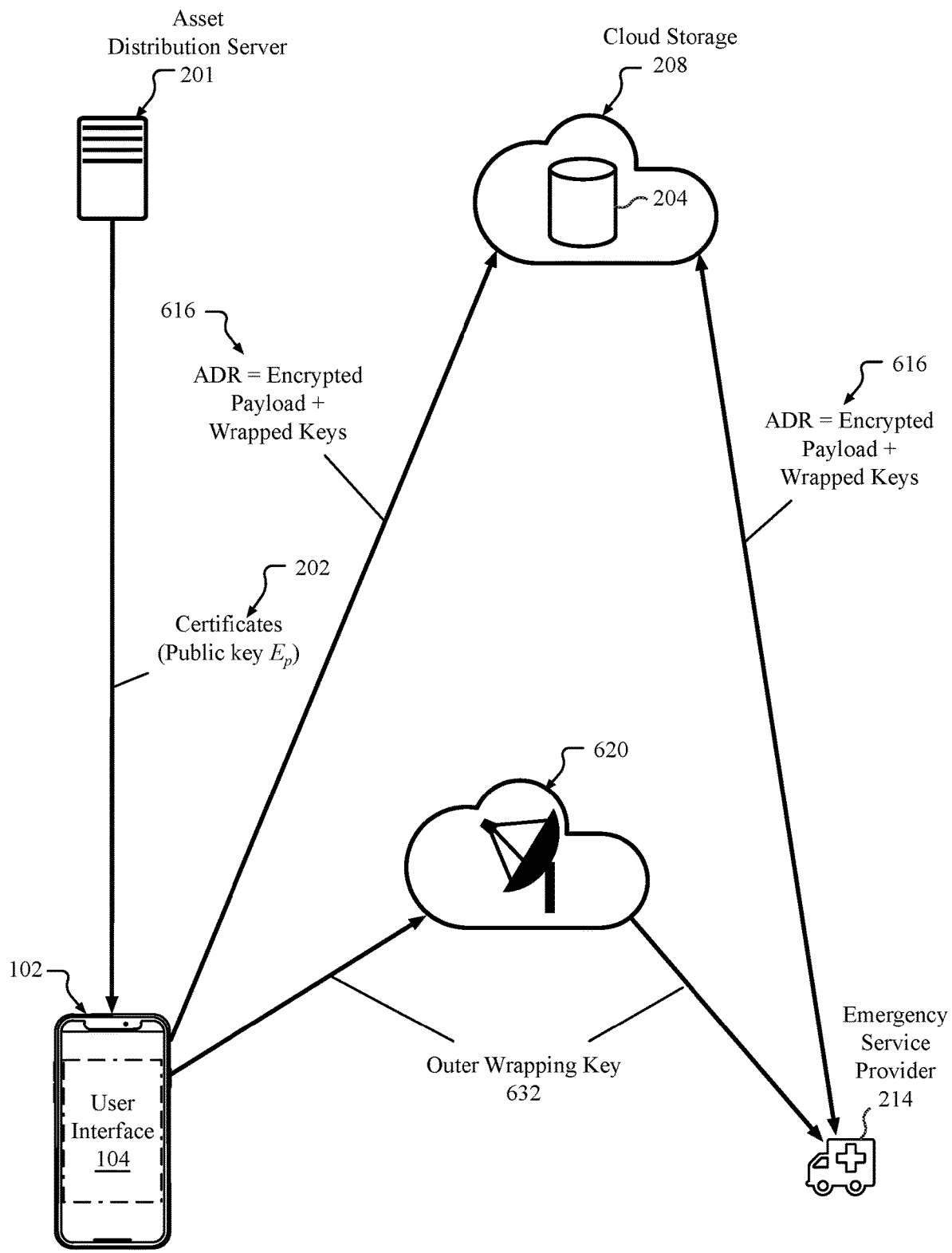

FIG. 6A-6B illustrates additional architectures to enable data encryption for emergency response, according to an embodiment. Asset distribution server 201, certificates 202, cloud storage repository 204, and user interface 104 function as described above with respect to FIG. 2. In these additional architectures, the encrypted payload (ADR) can be uploaded ahead of time. The location (e.g., coordinates and/or LIS) data and wrapping keys are then disclosed during an emergency services incident.

As shown in FIG. 6A, the wrapped key can be excluded from the ADR package 606 that is uploaded to the cloud storage server 208 and retrieved by the emergency service provider partners (e.g., emergency service provider 214). The ADR package 606 can be uploaded asynchronously before the occurrence of an incident that prompts a user of the mobile device 102 to contact emergency services. Along with current location data and/or LIS data, the wrapped key 622 for each emergency service provider partner can be made available to the emergency service provider 214 via a long-range wireless network link 620, which may be, but is not limited to, a satellite-based wireless link. The long-range wireless network link 620 may be a lower-bandwidth but longer ranger wireless communication mechanism than, for example, a Wi-Fi or cellular-based wireless network link.

Periodically, a new or updated instance of the ADR package 606 can be uploaded to the cloud storage server 208. For example, the ADR package 606 may be re-uploaded with a new encrypted payload in response to a rotation of certificate data by the partnered emergency service providers or in response to a significant change in data that is stored in the ADR. A change can be determined to be significant if a change occurs to the value of over a threshold number of data elements. The change can also be determined to be significant if the absolute magnitude of the change in the value of a specific data element is over a threshold. In one embodiment, if the mobile device 102 determines that the ADR package 606 that was most recently uploaded differs significantly than the current ADR data stored on the mobile device, an indicator may be transmitted to the emergency service provider 214 along with the wrapped key 622 that indicates that the ADR stored in the cloud storage repository 204 may be out of date. If sufficient bandwidth is available over the over the long-range wireless network link 620, an incremental update for data stored in the ADR can be encrypted and transmitted along with the wrapped key 622 and the location data.

FIG. 6B illustrates an architecture in which the data to be transmitted during an emergency can be further reduced. As the number of wrapping keys to be transmitted during an incident can grow linearly with the number of partnered emergency service providers, the amount of data to be transmitted during an incident may grow large enough to be difficult to efficiently transmit over the long-range wireless network link 620.

To reduce the amount of data to be transmitted during an incident, in one embodiment the set of wrapped keys for the various partnered emergency service providers for an area are further wrapped by an outer wrapping key 632. The further wrapping can be performed using a key encapsulation mechanism using input data that is not specific to any one emergency service provider. The ADR package 616, including the set of wrapped keys, can be asynchronously transmitted to the cloud storage server 208. The outer wrapping key 632, along with location (e.g., coordinates and/or LIS) data can be transmitted at the time of an emergency event over the long-range wireless network link 620. This outer wrapping key 632 can be used by the various emergency service providers to unwrap the set of wrapped keys. The emergency service provider 214 can then use provider specific data to further decrypt the unwrapped keys. The decrypted and unwrapped keys can then be used by the provider to decrypt the encrypted payload within the ADR package 616. In one embodiment, the outer wrapping key 632 is transmitted to the cloud storage server 208 at the time of an incident and stored in cloud storage repository 204. In one embodiment, the outer wrapping key 632 may be stored to a different server than the ADR package 616. In one embodiment, outer wrapping key 632 may be transmitted directly to an emergency service provider 214.

Figure 7A:
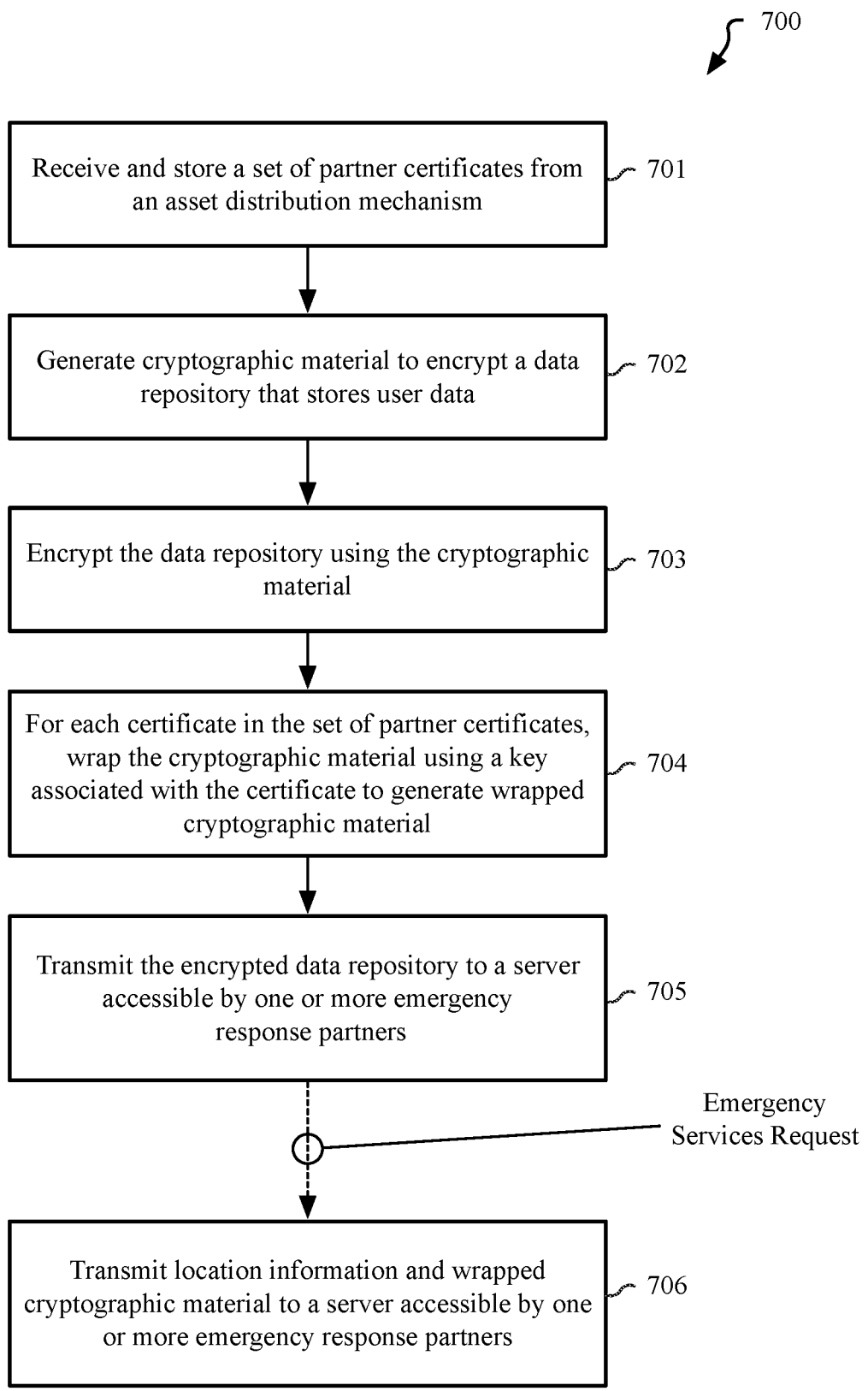
FIG. 7A-7B are flow diagrams of methods to facilitate asynchronous transmission of encrypted user data for use by emergency service providers.
Figure 7B:
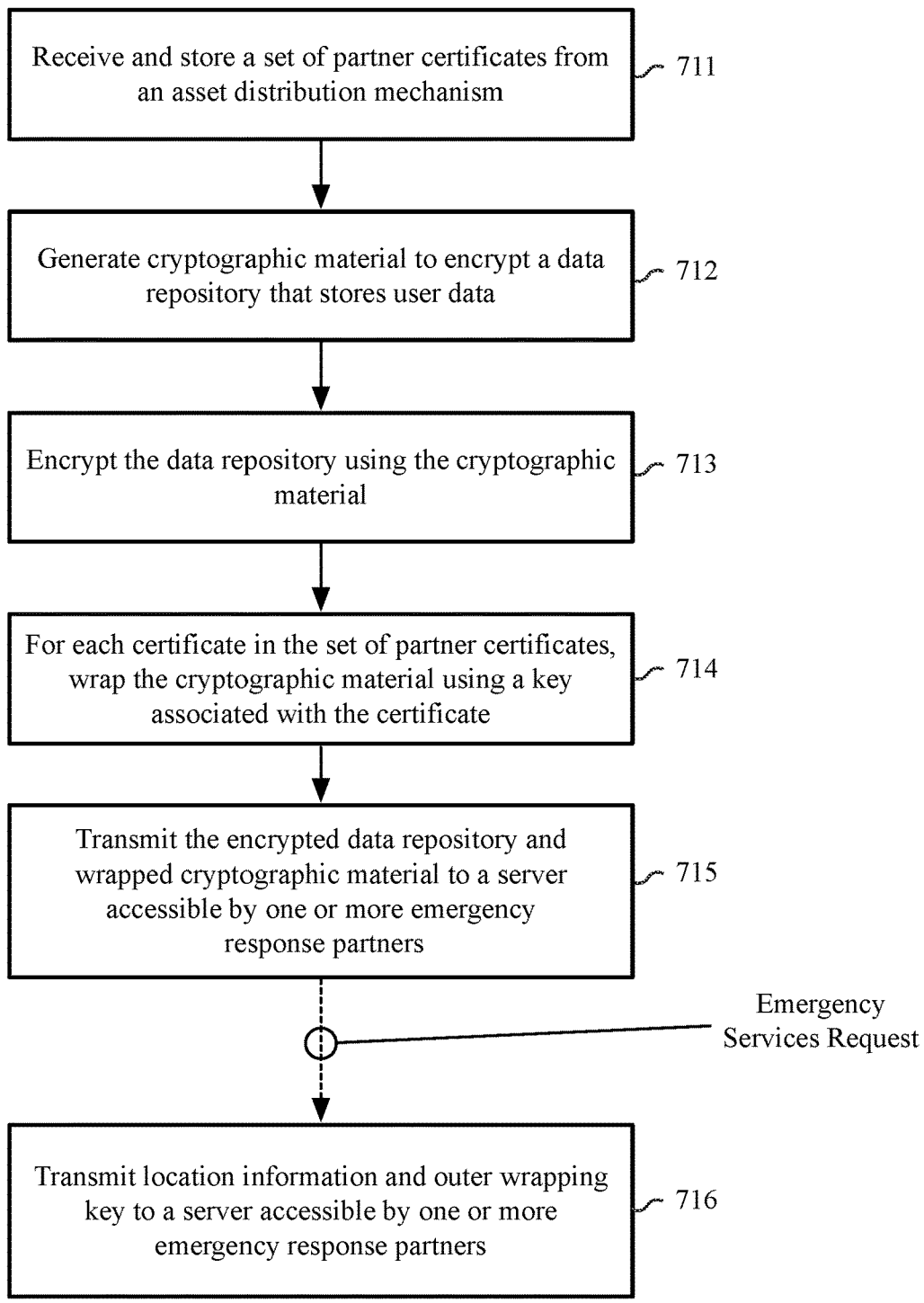

FIG. 7A-7B are flow diagrams of methods to facilitate asynchronous transmission of encrypted user data for use by emergency service providers. FIG. 7A illustrates a method 700 for asynchronous transmission of encrypted data to an emergency service provider. FIG. 7B illustrates and additional method 710 for asynchronous transmission of encrypted data to an emergency service provider. Method 700, 710 describe a generalized version of the specific operations described above.

As show in FIG. 7A, a mobile device can receive and store a set of partner certificates from an asset distribution mechanism (701), then generate cryptographic material to encrypt a data repository that stores user data (702). The mobile device can then encrypt the data repository using the cryptographic material (703). For each certificate in the set of partner certificates, the mobile device can wrap the cryptographic material using a key associated with the certificate to generate wrapped cryptographic material (704). The mobile device can then transmit the encrypted data repository to a server accessible by one or more emergency response partners (705). In response to an emergency services request initiated at the mobile device, the device can transmit location information and wrapped cryptographic material to a server accessible by one or more emergency response partners (706). The encrypted data repository stored on the server can be periodically updated by the mobile device, or can be updated in response a significant change in the data stored in the encrypted data repository. The location information and wrapped cryptographic material can be transmitted via a long range (e.g., satellite-based) wireless communication method, while the encrypted data repository and wrapped encryption keys can be transmitted via a Wi-Fi or mobile data network before the initiation of the emergency services request.

As shown in FIG. 7B, an additional or alternate method 710 can be performed by a mobile device in which the mobile device can receive and store a set of partner certificates from an asset distribution mechanism (711). The mobile device can then generate cryptographic material to encrypt a data repository that stores user data (712), then encrypt the data repository using the cryptographic material (713). For each certificate in the set of partner certificates, the mobile device can wrap the cryptographic material using a key associated with the certificate (714). The mobile device can then transmit the encrypted data repository and wrapped cryptographic material to a server accessible by one or more emergency response partners (715). The wrapped cryptographic material can include wrapped keys for all service providers known to the mobile device. In response to an emergency services request, the mobile device can then transmit location information and an outer wrapping key to a server accessible by one or more emergency response partners (716). The encrypted data repository stored on the server can be periodically updated by the mobile device, or can be updated in response a significant change in the data stored in the encrypted data repository. The location information and outer wrapping key can be transmitted via a long range (e.g., satellite-based) wireless communication method, while the encrypted data repository and wrapped encryption keys can be transmitted via a Wi-Fi or mobile data network before the initiation of the emergency services request.

Figure 8:
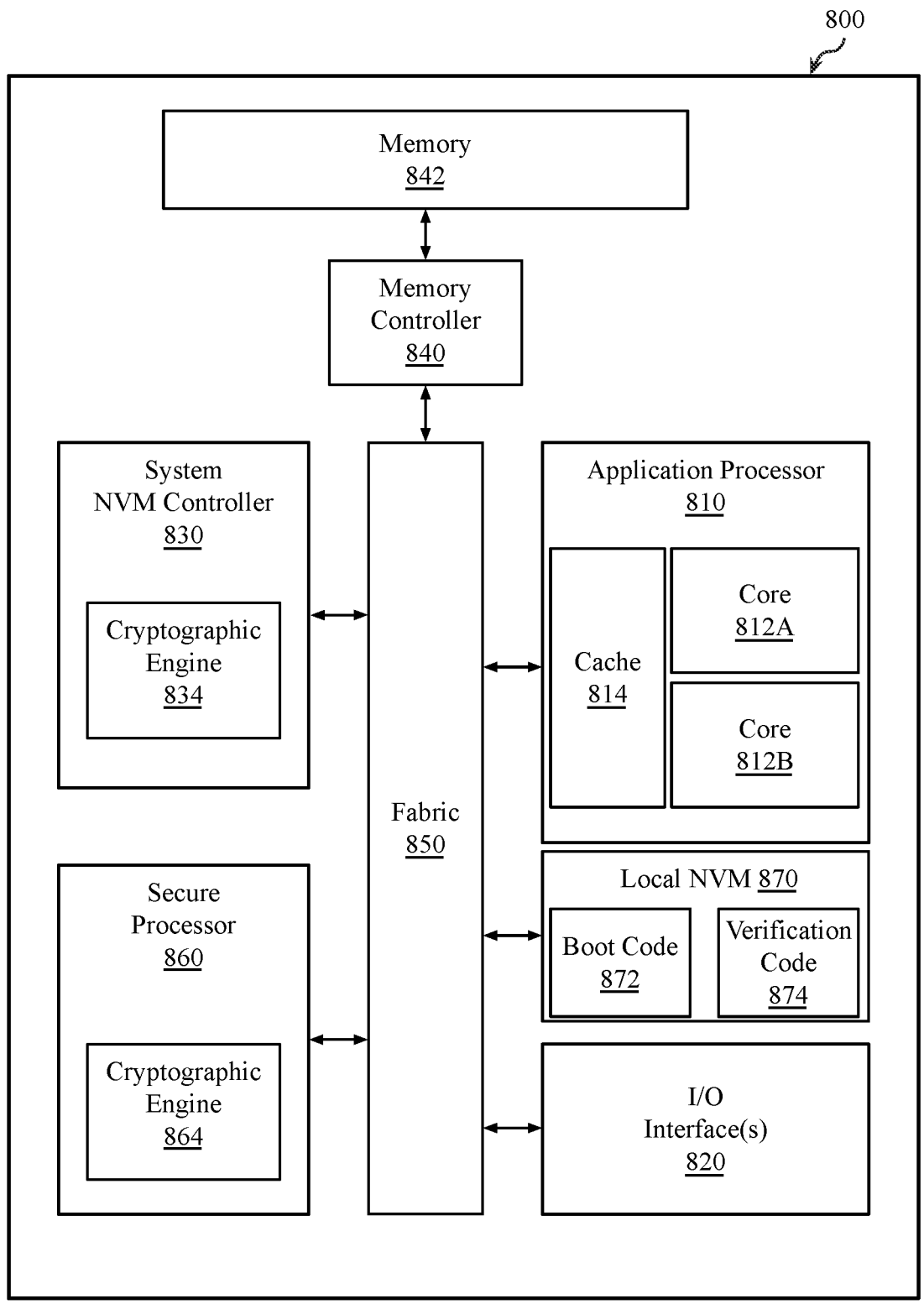
FIG. 8 illustrates an exemplary processing system suitable for the generation of cryptographic material.

FIG. 8 illustrates an exemplary processing system suitable for the generation of cryptographic material. In one embodiment the processing system 800 includes an application processor 810 and a crossbar fabric 850 that enables communication within the processing system 800, although a system bus may also be used in other embodiments. In one embodiment the application processor 810 includes multiple cores 812A-812B and at least one cache 814. The application processor 810 can facilitate execution of various applications on an electronic device, such as a smartphone, table, wearable device, or other electronic devices described herein. The application processor 810 can then securely boot using boot code 872 stored on local non-volatile memory 870, which can be a separate storage device than the primary non-volatile memory of the system, or can be a secure portion of the primary non-volatile memory. The boot code can be accompanied by verification code 874 that can be used verify that the boot code 872 has not been modified.

The processing system 800 also includes a secure processor 860, which can be any secure processor described herein, such as but not limited to a secure enclave processor (SEP), a secure element, or a trusted platform module (TPM). The secure processor 860 includes a secure circuit configured to maintain user keys for encrypting and decrypting data keys associated with a user. As used herein, the term "secure circuit" refers to a circuit that protects an isolated, internal resource from being directly accessed by any external circuits. The secure processor 860 can be used to secure communication with the peripherals connected via the peripheral hardware interface(s) 820. The secure processor 860 can include a cryptographic engine 864 that includes circuitry to perform cryptographic operations for the secure processor 860. The cryptographic operations can include the encryption and decryption of data keys that are used to perform storage volume encryption or other data encryption operations within a system.

The processing system 800 can also include a system non-volatile memory controller 830 that manages primary non-volatile memory of the system. The system non-volatile memory controller can also include a cryptographic engine 834 to enable the real-time encryption and decryption of data stored to the system non-volatile memory. The cryptographic engines 834, 864 may each implement any suitable encryption algorithm such as the Data Encryption Standard (DES), Advanced Encryption Standard (AES), Rivest Shamir Adleman (RSA), or Elliptic Curve Cryptography (ECC) based encryption algorithms.

The application processor 810, secure processor 860 and system non-volatile memory controller 830 may make use of a shared memory 842 that is accessible via a memory controller 840 coupled with the crossbar fabric 850. The various processors and controllers can also include internal memory, including cache memories. The secure processor 860 can also include a secure memory that is accessible only to the secure processor and is protected from being accessed by programs that execute on the application processor 810. The secure processor 860 may also designate a portion of the shared memory 842 as secure memory. Portions of the shared memory 842 that are designated as secure memory may be encrypted using keys stored within or accessible only to the secure processor 860.

Figure 9:
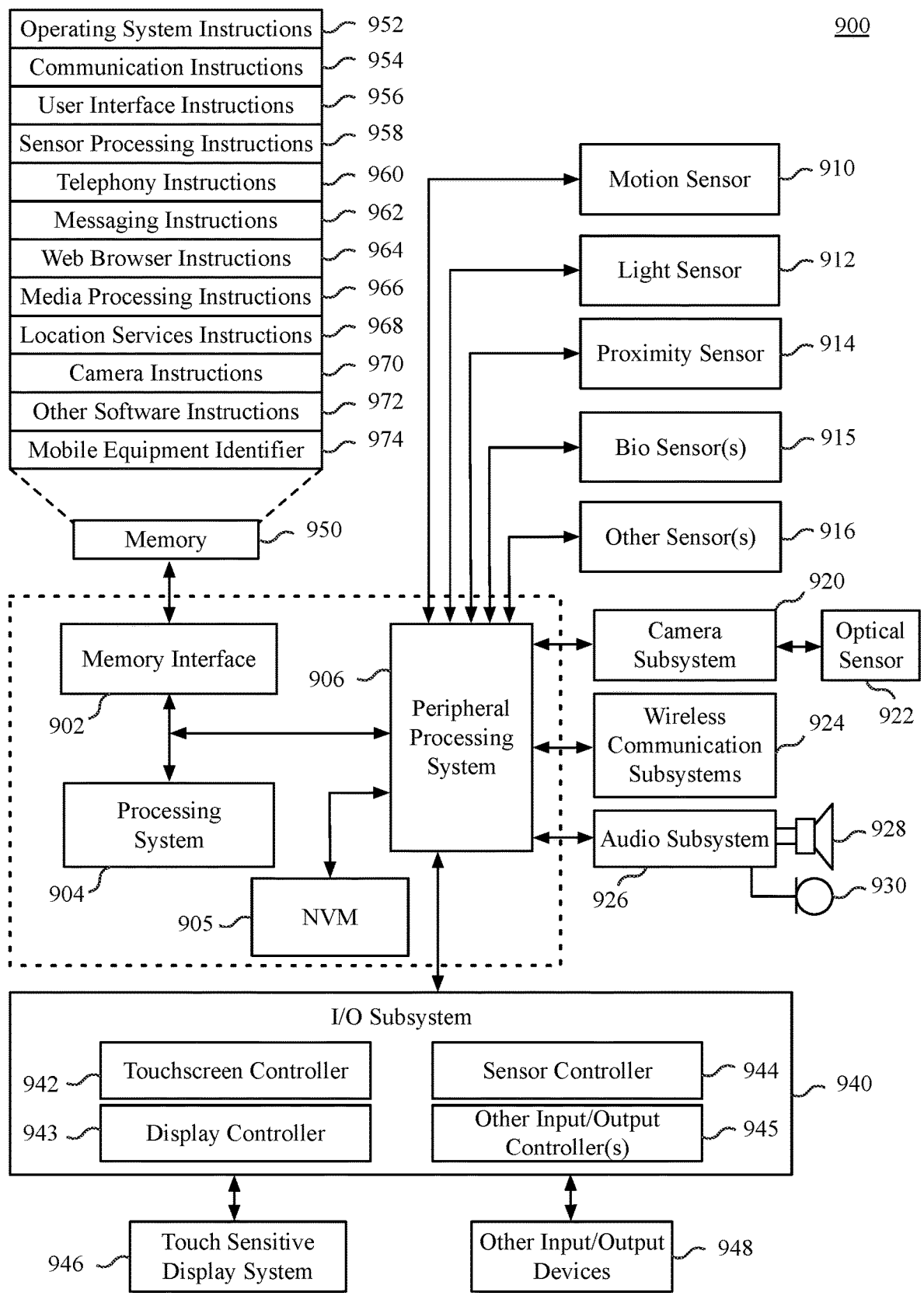
FIG. 9 is a block diagram of a computing device architecture, according to an embodiment.

FIG. 9 is a block diagram of a computing device architecture 900, according to an embodiment. The computing device architecture 900 includes a memory interface 902, a processing system 904, and a peripherals processing system 906. The various components can be coupled by one or more communication buses, fabrics, or signal lines. The various components can be separate logical components or devices or can be integrated in one or more integrated circuits, such as in a system on a chip integrated circuit. The processing system 904 may include multiple processors and/or co-processors. The various processors within the processing system 904 can be similar in architecture or the processing system 904 can be a heterogeneous processing system. In one embodiment the processing system 904 is a heterogeneous processing system including one or more data processors, image processors graphics processing units, and neural network processors.

The memory interface 902 can be coupled to memory 950, which can include high-speed random-access memory such as static random-access memory (SRAM) or dynamic random-access memory (DRAM). The non-volatile memory 905 can store runtime information, data, and/or instructions in non-volatile memory devices such as flash memory (e.g., NAND flash, NOR flash, etc.). The connection between the processing system 904 and memory interface 902 to the non-volatile memory 905 can be facilitated via the peripherals processing system 906.

Sensors, devices, and subsystems can be coupled to the peripherals processing system 906 to facilitate multiple functionalities. For example, a motion sensor 910, a light sensor 912, and a proximity sensor 914 can be coupled to the peripherals processing system 906 to facilitate the mobile device functionality. Other sensors 916 can also be connected to the peripherals processing system 906, such as a positioning system (e.g., GPS receiver), a temperature sensor, a biometric sensor, or other sensing device, to facilitate related functionalities. A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

The peripherals processing system 906 can enable a connection to and perform processing on behalf of various peripheral devices of the computing device architecture 900. In one embodiment the peripherals processing system 906 facilitates communication between the processing system 904 and communication peripherals of the architecture, including one or more wireless communication subsystems 924 that can include radio frequency receivers and transmitters and/or optical (e.g., infrared) receivers and transmitters. The specific design and implementation of the wireless communication subsystems 924 can depend on the communication network(s) over which a mobile device is intended to operate. For example, a mobile device including the illustrated computing device architecture 900 can include wireless communication subsystems 924 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The wireless communication subsystems 924 can provide a communications mechanism over which a client browser application can retrieve resources from a remote web server. The peripherals processing system 906 can also enable an interconnect to an audio subsystem 926, which can be coupled to a speaker 928 and a microphone 930 to facilitate voice-enabled functions, such as voice recognition, voice replication, digital recording, and telephony functions.

The peripherals processing system 906 can enable a connection to an I/O subsystem 940 that includes a touchscreen controller 942 and/or other input controller(s) 945. The touchscreen controller 942 can be coupled to a touch sensitive display system 946 (e.g., touchscreen). The touch sensitive display system 946 and touchscreen controller 942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 946. Display output for the touch sensitive display system 946 can be generated by a display controller 943. In one embodiment the display controller 943 can provide frame data to the touch sensitive display system 946 at a variable frame rate.

In one embodiment a sensor controller 944 is included to monitor, control, and/or processes data received from one or more of the motion sensor 910, light sensor 912, proximity sensor 914, or other sensors 916. The sensor controller 944 can include logic to interpret sensor data to determine the occurrence of one of more motion events or activities by analysis of the sensor data from the sensors.

In one embodiment the peripherals processing system 906 can also enable a connection to one or more bio sensor(s) 915. A bio sensor can be configured to detect biometric data for a user of computing device. Biometric data may be data that at least quasi-uniquely identifies the user among other humans based on the user's physical or behavioral characteristics. For example, in some embodiments the bio sensor(s) 915 can include a finger print sensor that captures fingerprint data from the user. In another embodiment, bio sensor(s) 915 include a camera that captures facial information from the face of a user. In some embodiments the bio sensor(s) 915 can maintain previously captured biometric data of an authorized user and compare the captured biometric data against newly received biometric data to authenticate a user.

In one embodiment the I/O subsystem 940 includes other input controller(s) 945 that can be coupled to other input/control devices 948, such as one or more buttons, rocker switches, thumb-wheel, infrared port, USB port, and/or a pointer device such as a stylus, or control devices such as an up/down button for volume control of the speaker 928 and/or the microphone 930.

In one embodiment, the memory 950 coupled to the memory interface 902 can store instructions for an operating system 952, including portable operating system interface (POSIX) compliant and non-compliant operating system or an embedded operating system. The operating system 952 may include instructions for handling basic system services and for performing hardware dependent tasks. In some implementations, the operating system 952 can be a kernel or micro kernel-based operating system.

The memory 950 can also store communication instructions 954 to facilitate communicating with one or more additional devices, one or more computers and/or one or more servers, for example, to retrieve web resources from remote web servers. The memory 950 can also include user interface instructions 956, including graphical user interface instructions to facilitate graphic user interface processing.

Additionally, the memory 950 can store sensor processing instructions 958 to facilitate sensor-related processing and functions; telephony instructions 960 to facilitate telephone-related processes and functions; messaging instructions 962 to facilitate electronic-messaging related processes and functions; web browser instructions 964 to facilitate web browsing-related processes and functions; media processing instructions 966 to facilitate media processing-related processes and functions; location services instructions including GPS and/or navigation instructions 968 and Wi-Fi based location instructions to facilitate location based functionality; camera instructions 970 to facilitate camera-related processes and functions; and/or other software instructions 972 to facilitate other processes and functions, e.g., security processes and functions, and processes and functions related to the systems. The memory 950 may also store other software instructions such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. A mobile equipment identifier, such as an International Mobile Equipment Identity (IMEI) 974 or a similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions may be implemented in hardware and/or in software, including in one or more signal processing and/or application specific integrated circuits.

In the foregoing specification, details have been described with reference to specific embodiments. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

For example, one embodiment provides a method on a mobile electronic device to facilitate the transmission of encrypted user data to a service provider, such as an emergency service provider. The method includes receiving and storing a set of publicly trusted certificates, generating cryptographic material to encrypt a data repository that stores user data, encrypting the data repository using the cryptographic material, and wrapping the cryptographic material using a key associated with a publicly trusted certificate. The publicly trusted certificate is associated with the service provider, such as but not limited to an emergency service provider that is partnered with the vendor of the mobile electronic device. In response to input at the mobile device to initiate an emergency services request, the mobile device can transmit the encrypted data repository and wrapped cryptographic material to a server for storage in a storage repository. The storage repository can be accessible by the service provider. Other embodiments provide a non-transitory, machine readable medium that stores instructions to perform operations of the above method or any other method described herein.

One embodiment provides a data processing system on a mobile electronic device. The data processing system includes a wireless network interface, a memory device having instructions stored thereon, and one or more processors coupled with the wireless network interface and the memory device. The one or more processors are configured to execute instructions stored on the memory device. The instructions cause the one or more processors to receive and store a set of publicly trusted certificates, generate cryptographic material to encrypt a data repository that stores user data, encrypt the data repository using the cryptographic material to generate an encrypted data repository, and wrap the cryptographic material using a key associated with a publicly trusted certificate. The one or more processors can then transmit, via the wireless network interface, the encrypted data repository and wrapped cryptographic material to a server for storage in a storage repository. The storage repository is accessible by a service provider, such as an emergency service provider.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method on a mobile electronic device comprising:
receiving and storing a set of publicly trusted certificates;
generating cryptographic material to encrypt a data repository that stores user data;
encrypting the data repository using the cryptographic material to generate an encrypted data repository;
wrapping the cryptographic material using a key associated with a publicly trusted certificate, wherein the publicly trusted certificate is associated with an emergency medical service provider;
receiving an input to initiate an emergency service request for emergency medical services; and
in response to receiving the input to initiate the emergency service request, transmitting the encrypted data repository and wrapped cryptographic material to a server for storage in a storage repository, the storage repository accessible by the emergency medical service provider, wherein the emergency medical service provider accesses and decrypts the wrapped cryptographic material using a certificate associated with the mobile electronic device.

2. The method as in claim 1, further comprising:
transmitting the encrypted data repository to the server before transmission of the wrapped cryptographic material; and
transmitting the wrapped cryptographic material to the server in response to input at the mobile electronic device to initiate an emergency medical services request.

3. The method as in claim 2, further comprising transmitting location information for the mobile electronic device in response to the input at the mobile electronic device to initiate the emergency medical services request.

4. The method as in claim 3, further comprising transmitting an updated encrypted data repository to the server in response to a change in user data stored in the data repository stored on the mobile electronic device.

5. The method as in claim 1, wherein transmitting the wrapped cryptographic material to the server includes:
wrapping the wrapped cryptographic material using an outer wrapping key to generate further wrapped cryptographic material; and
transmitting further wrapped cryptographic material to the server as the wrapped cryptographic material.

6. The method as in claim 5, further comprising, in response to an input at the mobile electronic device to initiate an emergency medical services request, transmitting the outer wrapping key and location information for the mobile electronic device to the server.

7. The method as in claim 1, further comprising:
binding the encrypted data repository with the wrapped cryptographic material via a hash value generated based on the encrypted data repository; and
including a representation of the hash value in data that is transmitted to the server.

8. The method as in claim 7, wherein including the representation of the hash value in the data that is transmitted to the server includes transmitting the hash value to the server.

9. The method as in claim 7, wherein including the representation of the hash value in the data that is transmitted to the server includes transmitting a key derived based on the hash value to the server.

10. A data processing system on a mobile electronic device, the data processing system comprising:
a wireless network interface;
a memory device having instructions stored thereon; and
one or more processors coupled with the wireless network interface and the memory device, wherein the one or more processors are configured to execute instructions stored on the memory device, the instructions to cause the one or more processors to:
receive and store a set of publicly trusted certificates;
generate cryptographic material to encrypt a data repository that stores user data;
encrypt the data repository using the cryptographic material to generate an encrypted data repository;
wrap the cryptographic material using a key associated with a publicly trusted certificate, wherein the publicly trusted certificate is associated with an emergency medical service provider;
receive an input to initiate an emergency service request for emergency medical services; and
in response to receiving the input to initiate the emergency service request, transmit the encrypted data repository and wrapped cryptographic material to a server for storage in a storage repository, the storage repository accessible by the emergency medical service provider, wherein the emergency medical service provider accesses and decrypts the wrapped cryptographic material using a certificate associated with the mobile electronic device.

11. The data processing system as in claim 10, the one or more processors further to:
transmit the encrypted data repository and the wrapped cryptographic material to the server in response to an input at the mobile electronic device to initiate an emergency medical services request.

12. The data processing system as in claim 10, the one or more processors further to:
transmit the encrypted data repository to the server before transmission of the wrapped cryptographic material; and
transmit the wrapped cryptographic material to the server in response to input at the mobile electronic device to initiate an emergency medical services request.

13. The data processing system as in claim 12, the one or more processors further to transmit location information for the mobile electronic device in response to the input at the mobile electronic device to initiate the emergency medical services request.

14. The data processing system as in claim 10, wherein to transmit the wrapped cryptographic material to the server includes to:
wrap the wrapped cryptographic material using an outer wrapping key to generate further wrapped cryptographic material; and
transmit further wrapped cryptographic material to the server as the wrapped cryptographic material.

15. The data processing system as in claim 14, further comprising, in response to an input at the mobile electronic device to initiate an emergency medical services request, transmit the outer wrapping key and location information for the mobile electronic device to the server.

16. A non-transitory machine readable medium storing instructions which, when executed by one or more processors on a mobile electronic device, cause the one or more processors to perform operations comprising:
receiving and storing a set of publicly trusted certificates;
generating cryptographic material to encrypt a data repository that stores user data;
encrypting the data repository using the cryptographic material to generate an encrypted data repository;
wrapping the cryptographic material using a key associated with a publicly trusted certificate, wherein the publicly trusted certificate is associated with an emergency medical service provider;
receiving an input to initiate an emergency service request for emergency medical services; and
in response to receiving the input to initiate the emergency service request, transmitting the encrypted data repository and wrapped cryptographic material to a server for storage in a storage repository, the storage repository accessible by the emergency medical service provider accesses and decrypts the wrapped cryptographic material using a certificate associated with the mobile electronic device.

17. The non-transitory machine readable medium as in claim 16, further comprising:
transmitting the encrypted data repository to the server before transmission of the wrapped cryptographic material; and
transmitting the wrapped cryptographic material to the server in response to input at the mobile electronic device to initiate an emergency medical services request.

18. The non-transitory machine readable medium as in claim 16, further comprising:
binding the encrypted data repository with the wrapped cryptographic material via a hash value generated based on the encrypted data repository; and
including a representation of the hash value in data that is transmitted to the server.

19. The method of claim 1, wherein the input is received on a user interface via a touch-sensitive display of the mobile electronic device.

20. The method of claim 3, wherein the location information includes an altitude coordinate.

* * * * *